United States Patent [19]

Shikichi et al.

[11] Patent Number: 4,800,546
[45] Date of Patent: Jan. 24, 1989

[54] OPTICAL INFORMATION RECORD/REGENERATING APPARATUS WITH DEVICE FOR PROHIBITING MOVEMENT OF OPTICAL HEAD

[75] Inventors: Satoshi Shikichi; Akio Aoki, both of Tokyo; Kazuo Minoura, Yokohama, all of Japan

[73] Assignee: Canon Kabushiki Kaisha, Tokyo, Japan

[21] Appl. No.: 910,974

[22] Filed: Sep. 24, 1986

[30] Foreign Application Priority Data

Sep. 26, 1985 [JP] Japan .................. 60-211143

[51] Int. Cl.⁴ ........................................... G11B 7/085
[52] U.S. Cl. ..................................... 369/44; 358/907; 235/476; 235/479
[58] Field of Search ............... 235/454, 456, 470, 476, 235/479; 360/2; 369/44, 45, 46, 32; 358/907, 342

[56] References Cited

U.S. PATENT DOCUMENTS

| | | | |
|---|---|---|---|
| 3,854,015 | 12/1974 | Janssen. | |
| 4,057,832 | 11/1977 | Kappert | 369/44 |
| 4,236,232 | 11/1980 | Jansen et al. | 369/44 |
| 4,330,880 | 5/1982 | Van Dijk | 369/44 |
| 4,489,406 | 12/1984 | Hsieh et al. | 369/44 |
| 4,567,533 | 1/1986 | Assink | 358/907 |
| 4,567,534 | 1/1986 | Groen et al. | 35/907 |
| 4,613,963 | 9/1986 | Hirano | 358/907 |

Primary Examiner—Donald McElheny, Jr.
Attorney, Agent, or Firm—Fitzpatrick, Cella, Harper & Scinto

[57] ABSTRACT

There is disclosed an optical information record/regenerating apparatus, provided with an optical system for forming a light spot on an optical information recording medium having plural tracks and a track jump area in the tracks, and an optical head movably supporting the optical system so as that the light spot can be moved at least to an adjacent track in the track jump area. Information recording and/or regeneration is achieved by moving both the optical head relative to the recording medium, and by moving the optical system within the optical head. However, the movement of the optical head is prohibited in the track jump area to stabilize the track control operation.

6 Claims, 3 Drawing Sheets

OPTICAL INFORMATION RECORD/REGENERATING APPARATUS WITH DEVICE FOR PROHIBITING MOVEMENT OF OPTICAL HEAD

BACKGROUND AND SUMMARY OF THE INVENTION

The present invention relates to an apparatus for optically record/regenerating or reproducing information, and in particular to an optical information record/regenerating apparatus provided with a track jump function for driving an optical system, for forming a light spot on an optical information recording medium, to move the light spot to a neighboring track.

For optical information recording and regeneration, there are already known media of various shapes such as disk, card and tape. Among these, a card-shaped optical information recording medium, hereinafter called an optical card, is expected to have a large demand as a compact, light and conveniently portable recording medium of a large capacity.

FIGS. 1A and 1B are respectively a schematic plan view and a front view of a driving unit of an optical information record/regenerating apparatus utilizing such optical card, wherein the optical card 1 is placed on a shuttle 2 fixed on a belt 3, which is supported by pulleys 4, 4'. The pulley 4 is rotated by a DC motor 5. Thus the shuttle 2 and the optical card 1 can be displaced in the direction of x-axis by the forward or reverse rotation of the motor 5.

Above the optical card 1, or in front of the plane of drawing in FIG. 1A, there is provided an optical head 6 which movably supports an optical system 7. Said optical system 7 is rendered movable by a small amount in the direction of y-axis (indicated by an arrow in FIG. 1A) by, means of an unrepresented driving device (such as a tracking coil), and a light beam 8 converged by said optical system 7 forms light spots S1 and S2 on the optical card 1. Consequently said light spots S1, S2 are slightly movable in the y-axis direction by said optical system driving device, whereby said light spots follow a track on the recording medium by a tracking control. Naturally said optical system driving device also executes a focusing control but the details thereof will be omitted in the present description.

The optical head 6 is penetrated by a screw 9 rotated by a stepping motor 10 to allow large movement in the y-direction. Consequently the optical head 6 can be displaced in the y-direction by a desired distance, by controlling the direction and angle of rotation of the stepping motor 10 with appropriate pulses.

Now reference is made to FIG. 2 for explaining the function of the above-explained optical information record/regenerating apparatus.

As shown in FIG. 2, the optical card 1 is provided with a recording area a, track jump areas b, c, d and tracking tracks T1-Tn arranged with an auxiliary tracks Tj1-Tj(n−1) are provided alternating with the tracks T1-Tn.

Said auxiliary tracks Tj1-Tj(n−1) are parallel to the tracks T1-Tn−1 and are spaced by a distance yj therefrom in the areas b and d, but are angled by $\theta t$ to the tracks t1-tn−1 in the area c.

In the following there will be explained the function of the optical information record-regenerating apparatus, utilizing such preformatted optical card.

At first, in the recording area a, the light spot S1 formed by the optical system 7 irradiates for example a track T1, and the reflected light is utilized for tracking control. Also the light spot S2 irradiates a data track positioned between the tracks T1 and T2, with a high power to form pits in case of information recording, or with a low power to regenerate the recorded information from the reflected light in case of information reading. Due to tracking control based on the light spot S1, the light spot S2 always scans a predetermined position of the data track to achieve exact information recording or reading. Arrows attached to the light spots S1 and S2 in FIG. 2 indicate that, when the optical card 1 is displaced negatively or positively in the x-direction by the rotation of the motor 5, the light spots relatively move in the positive or negative direction in the x-axis.

When the light spots S1, S2 reach the area b of the track jump area b, c and d, the optical system 7 is displaced by a small amount in the positive y-direction by the optical system driving device, so that the light spots S1 and S2 jump by a distance yj in the positive y-direction. Consequently the light spot S1 for tracking control irradiates the auxiliary track Tj1, and said device so displaces the optical system that said light spot S1 follows said auxiliary track Tj1. Upon reaching the area d, the light spots S1 and S2 jump by a distance yj in the positive y-direction, whereby the light spot S1 is shifted to a neighboring track T2. Simultaneously the motor 5 is reversed whereby the light spots S1 and S2 start to move relatively in the negative x-direction. These operations are conducted for example by suitable detecting means and a system controller. In this manner a recording or reading operation is initiated for the neighboring track, and following tracks are subsequently scanned in succession in this manner.

The light spots S1 and S2 can make access to a desired track of the recording area a for information recording or reading, through such track jump operation and relative movements of the optical head 6 in the x- and y-directions of the optical card 1, by means of the motor 5 and the stepping motor 10.

However, in practice, the moving direction of the optical card 1 may not be parallel to the tracks T1-Tn due to an error in the precision of the manufacture. The moving direction of the optical card 1 in this case and that of the optical head 6 and optical system 7 are respectively indicated by broken-lined x- and y-axes, in FIG. 2, and a skew angle between the x-axis and the tracks T1-Tn is indicated by $\theta s$.

In the presence of such skew angle $\theta s$, the optical system driving device moves the optical system in the positive y-direction, in response to the movement of the light spots S1 and S2 relative to the optical card 1, so as that the light spot S1 can follow a track. However, the optical system driving device can move the optical system 7 only within a limited range, beyond which the tracking control becomes impossible as the light spot S1 can no longer follow the track. Consequently, before the tracking control reaches such limit, there is conducted a head moving operation in which the stepping motor 10 moves the entire optical head 6 by a distance $\Delta y$ in the positive y-direction, thereby returning the optical system 7 to its normal position within the optical head 6.

However, due to its large angular acceleration, the stepping motor 10 generates a large acceleration in the optical head 6 in the y-direction, thus resulting in a certain positional aberration between the light spot S1 and the track in said head moving operation. Particularly in the track jump operation when the optical system 7 has certain vibrations in the y-direction, the tracking control operation has to have a high sensitivity in order to accurately achieve the head moving operation. Also in the area c of the auxiliary track where the optical system is moving in the y-direction, the tracking control has to have a high sensitivity for moving the optical system 7 within a short time, in order to achieve accurate head moving operation.

On the other hand, a high sensitivity of the tracking control will activate the tracking control mechanism even for dust or a scar on the optical card 1, thus resulting in frequent mistracking.

For reducing the skew angle $\theta s$ in order to reduce the number of the head moving operations and to prevent such track derailments, there is required a higher precision for the optical card and the related mechanisms, thus leading to a higher cost of the system. Also such mistracking can be prevented by reducing the moving speed of the optical system 7 in the y-direction, but, for such purpose it becomes necessary to extend the area c or to reduce the speed of the shuttle 2 in the x-direction. The former will result in a corresponding reduction in the recording capacity of the optical card 1, while the latter will result in a loss in the record/regenerating speed.

FIG. 3 shows another card format, wherein a card 21 is provided with plural parallel tracking tracks T, which are continuous and do not show changes in the width or distance thereof, both in an information recording area A and a track jump area B.

Light spots Sb, Sc are so positioned as to partly or entirely cover different tracks T, which are mutually adjacent in case of FIG. 3 but need not necessarily be adjacent. An automatic tracking servo operation is conducted on a tracking error signal, obtained from the difference of the light spots Sb, Sc reflected by the optical card 21 and detected by suitable sensors, and a light spot Sa records and reads information.

The example shown in FIG. 3 lacks the auxiliary tracks shown in FIG. 2. Such auxiliary tracks Tj are effective when the tracking tracks are widely distanced. A long jump at a high speed requires a long time due to an overshooting phenomenon, and, in such case, auxiliary tracks Tj as shown in FIG. 2 allow to prevent this problem by shortening the distance of jump.

However, in case of a track pitch in the order to 20 microns, a direct jump to the neighboring track is possible without auxiliary tracks, as shown in FIG. 3. However, the example shown in FIG. 3 is also associated with the drawbacks at jumping operation as already explained in relation to FIG. 2.

Consequently, the object of the present invention is to provide an optical information record/regenerating apparatus which is not associated with the drawbacks arising out of the track jump operation regardless of the recording format of the optical information recording medium such as optical card.

The above-mentioned object can be achieved, according to the present invention, by an optical information record/regenerating apparatus provided with an optical system for forming at least a light spot on an optical information recording medium provided with plural tracks including a track jump area therein, and an optical head movably supporting said optical system for allowing said light spot to move at least to an adjacent track in said track jump area, and adapted to record or regenerate information both by a relative movement of said optical head with respect to said optical information recording medium, and by movement of the optical system within the optical head. However, movement of said optical head is prohibited while said light spot is located in said track jump area.

Absence of the movement of the optical head in the track jump area eliminates the positional aberration between the track and the light spot in the head moving operation. Consequently a stable track jump operation can be easily achieved, without increasing the sensitivity of the tracking control. Also the track control operation is stabilized without excessive reaction of the control mechanism to dust or scars on the recording medium, since the sensitivity of tracking control need not be particularly high.

DETAILED DESCRIPTION OF THE PREFERRED EMBODIMENTS

Figure 1A:
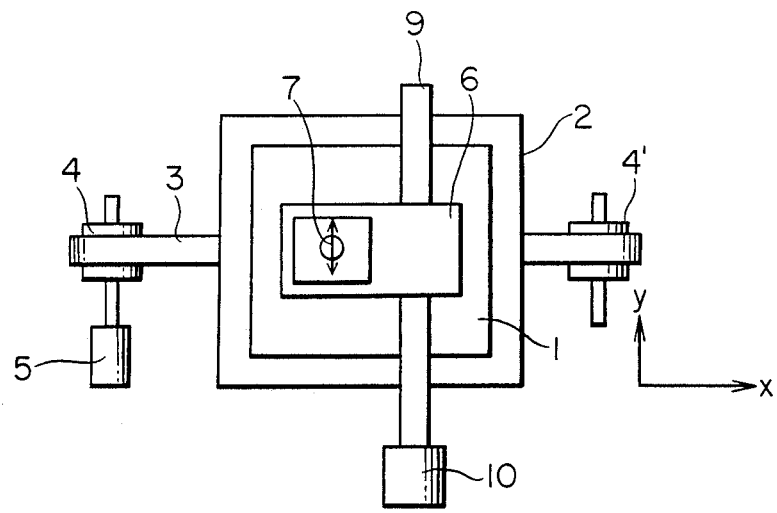
FIG. 1A is a schematic plan view of a driving unit of an optical information record/regenerating apparatus utilizing an optical card.
Figure 1B:
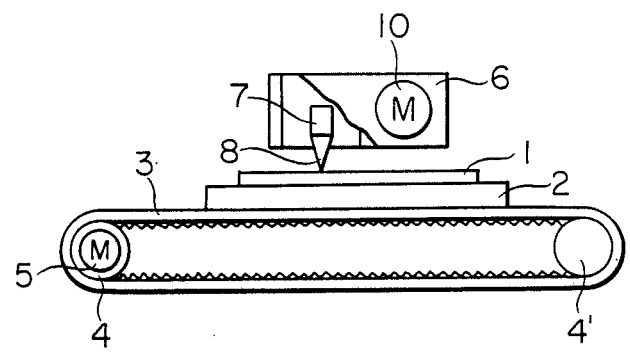
FIG. 1B is a schematic front view thereof.
Figure 4A:
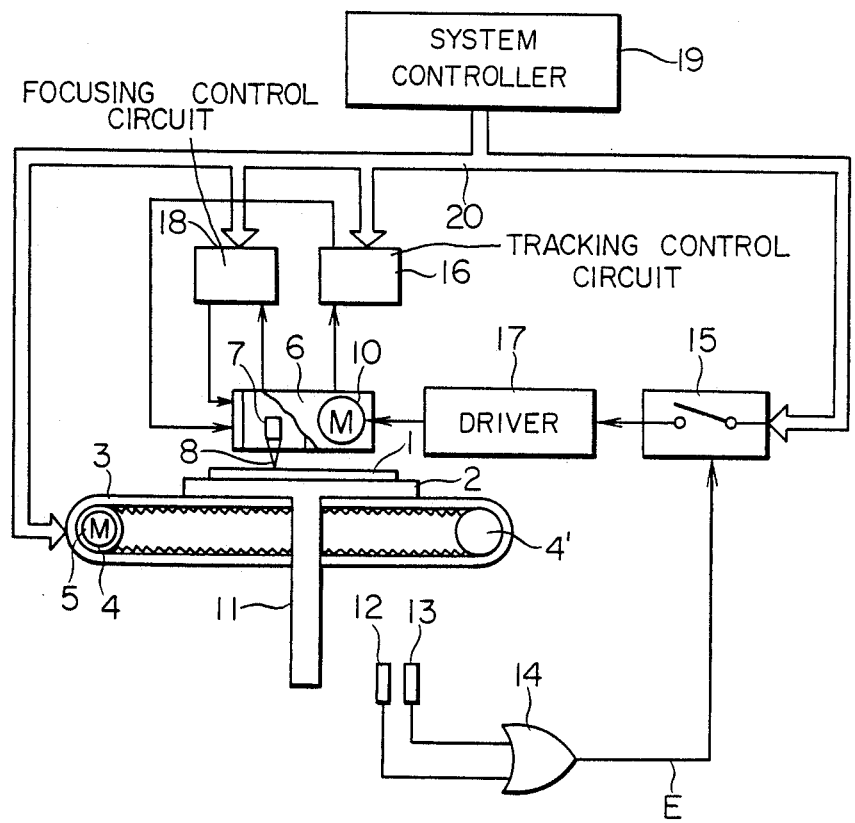
FIG. 4A is a schematic block diagram of an optical information record/regenerating apparatus embodying the present invention.

Referring to FIG. 4A, the shuttle 2 is provided with a light shielding plate 11, and there are provided photointerrupter 12, 13 (e.g. optical detector) at an end of the movable range of said light shield plate 11. Other components the same as those in FIGS. 1A and 1B are indicated by same numbers. The optical information recording medium employed in the present embodiment is same as that shown in FIG. 2.

The photointerrupters 12, 13 are provided for detecting whether the light spots S1 and S2 are in the track jump area of the optical card 1, wherein said photointerrupters 12 and 13 respectively detect the starting points of the areas b and d. Signals from said photointerrupters are supplied to an OR gate 14, from which an output signal is supplied, as a head move prohibiting signal E, to a control terminal of an analog switch 15.

The analog switch 15 is connected between a tracking control circuit 16 and a driver 17 for the stepping motor 10, and is opened or closed respectively when said head move prohibiting signal E is for example at the high level or at the low level.

The tracking control circuit 16 generates a tracking error signal for the tracking control of the light spot S1, and releases a head move signal when said error signal exceeds a predetermined range. In response to said head move signal, the driver 17 activates the stepping motor 10, thus moving the optical head 6 in the direction of y-axis.

The tracking control circuit 16 also releases a signal for driving the optical system driving device such as a tracking coil. A focusing control circuit 18 releases a signal for driving, for example, a focusing coil.

A system controller 19 for controlling the entire apparatus is connected, through signal lines 20, with the DC motor 5 etc.

Figure 2:
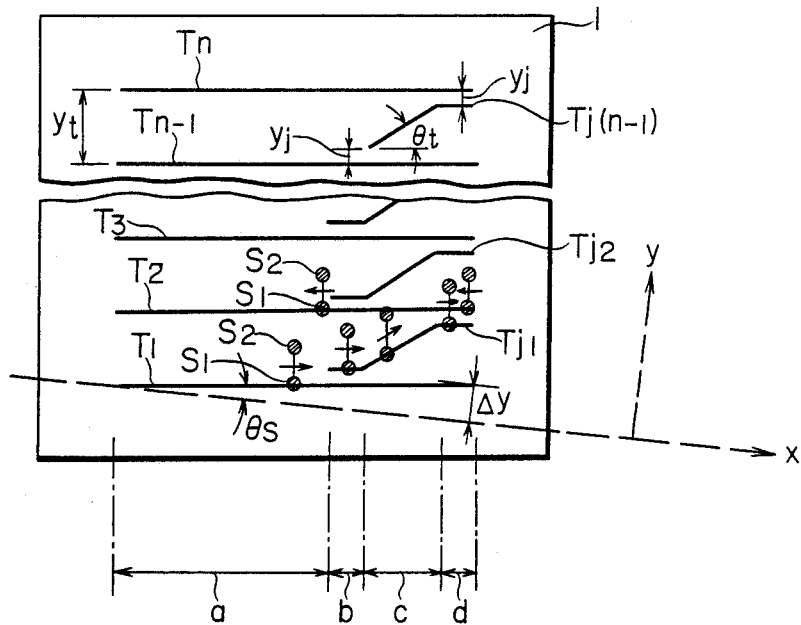
FIG. 2 is a schematic view of a format of the optical card.
Figure 3:
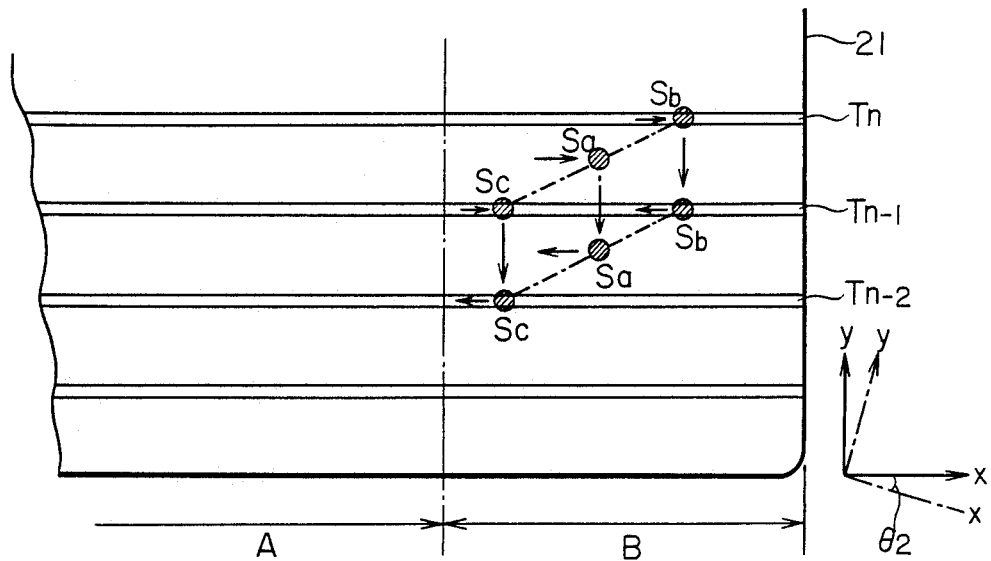
FIG. 3, consisting of A and B, is a schematic view of another format.
Figure 4B:
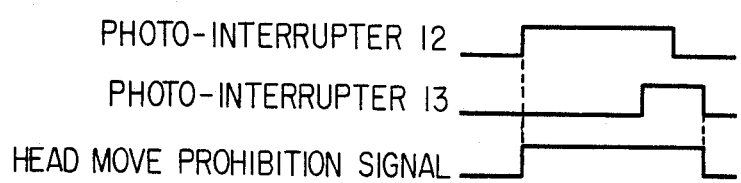
FIG. 4B is a signal wave form chart showing the function of said embodiment.

In the following an explanation will be given on the function of the present embodiment, while making reference to FIGS. 4B and 2.

When the light spots S1 and S2 are in the recording area a, the light shield plate 11 does not reach the photointerrupters 12 or 13, so that the head move prohibiting signal E is at the low level to close the analog switch 15.

If the aforementioned skew angle θs is present in this case, the optical system driving device displaces the optical system 7 in the positive y-direction through tracking control, thereby causing the light spot S1 to follow a track T1 in the recording area a. However, when the optical system 7 is significantly displaced from the standard position and the tracking error signal exceeds a predetermined value, the tracking control circuit 16 releases the head move signal. In response the stepping motor 10 is rotated in a desired direction to displace the optical head 6 in the positive y-direction, thereby returning the optical system 7 to the standard position through the function of the optical system driving device. In the recording area a, the above-explained tracking control function allows exact information recording and regeneration even in the presence of a skew angle θs.

When the light spots S1 and S2 reach the area b of the track jump area, the photointerrupter 12 is activated to shift the head move prohibiting signal to the high level thus turning off the analog switch 15. The width of the light shield plate 11 is so selected that the photointerrupter 13 is activated before the photointerrupter 12 is deactivated. Thus, during the presence of the light spots S1, S2 in the track jump area, the head move prohibiting signal is maintained at the high level and the analog switch 15 is maintained open.

During the open state of the analog switch 15, the head moving signal from the tracking control circuit 16 is not supplied to the driver 17, so that the optical head 6 is not moved in the y-direction. Consequently the optical system 7 is driven by the optical system driving device as already explained before, and the light spot S1 performs a track jump by jumping from a track T1 to an auxiliary track Tj1 in the area b, then following said auxiliary track Tj1 and jumping from the auxiliary track Tj1 to a track T2 in the area d, and repeats track scanning in this manner.

Such prohibition of the movement of the optical head 6 in the track jump area allows to stabilize the functions of track jumps and auxiliary track following, thus, realizing secure transfer of the light spot to the neighboring track.

Because the optical system 7 cannot be returned to the standard position by the movement of the optical head 6 in the track jump area, it is desirable to adjust the optical head, during the scanning of the recording area a, in such a manner that the optical system 7 is as close as possible to the standard position. Otherwise it is necessary to select the actual displacement of the optical system 7 sufficiently smaller than the range of displacement thereof by the optical system driving device, and to achieve a movement of the distance yt in said range.

In the present embodiment the track jump area is detected by separate means, composed of the light shield plate 11 and photointerrupters 12, 13, but said detection is naturally not limited to such method and may be achieved, for example, directly by the optical head.

As explained in the foregoing, the optical information record/regenerating apparatus of the present invention is capable of avoiding positional aberration between the track and light spots resulting from head move operation, since the optical head is not moved in the track jump area. Consequently a stable track, jump operation can be easily achieved, without requiring improvement in the precision of the optical information recording medium or equipment, without requiring improvement in the sensitivity of tracking control and further without sacrificing the capacity of the optical information recording medium or the record/regenerating speed. Also, since it is not necessary to increase the sensitivity of the tracking control, the control mechanism does not excessively react to dust or the like on the recording medium, and the tracking control can be conducted in sable manner. It is therefore possible to improve the reliability and to reduce the manufacturing cost.

What we claim is:

1. An optical information recording and/or regenerating apparatus comprising:
    an optical system for forming at least one light spot on an optical information recording medium provided with plural tracks and having a track jump area therein;
    an optical head including moving means for movably supporting said optical system;
    optical system driving means for driving said moving means so that said light spot is moved, in said track jump area, from a track at least to another track adjacent thereto;
    head move means for moving said optical head relative to said optical information recording medium in a direction substantially perpendicular to the tracks;
    detection means for detecting whether said light spot is positioned in said track jump area;
    tracking control means for controlling both said optical system driving means and said head move means according to a tracking error signal; and
    prohibition means for prohibiting the movement of said optical head by said head move means when said detection means detects that the light spot is positioned in said track jump area.

2. An optical information recording and/or regenerating apparatus according to claim 1, wherein said prohibition means is adapted to interrupt the control on said head move means by said tracking control means when said detection means detects that the light spot is positioned in said track jump area.

3. An optical information recording and/or regenerating apparatus according to claim 1, wherein said detection means comprises a light shield member provided on a shuttle supporting said optical information recording medium, and a photointerrupter provided at an end of the movable range of said light shield member.

4. An optical information recording and/or regenerating apparatus according to claim 1, wherein said optical system driving means is adapted to drive said optical system within a predetermined range around a standard position.

5. An optical information recording and/or regenerating apparatus according to claim 4, wherein said tracking control means is adapted to control said optical system driving means and said head move means in such a manner that said optical system is positioned generally at said standard position while the light spot moves in an area of the optical information recording medium outside said track jump area.

6. An optical information recording and/or regenerating apparatus according to claim 4, wherein said tracking control means is adapted to control said optical system driving means and said head move means in such a manner that said optical system is driven in a range smaller than said predetermined range, while the light spot moves in an area of the optical information recording medium outside said track jump area.

* * * * *